May 18, 1965 J. J. AMBROZAITIS 3,184,162

HIGH SPEED RESET COUNTER

Original Filed Sept. 26, 1958 4 Sheets-Sheet 1

INVENTOR.
JOHN J. AMBROZAITIS
BY Mandeville and Schweitzer
ATTORNEYS

HIGH SPEED RESET COUNTER

Original Filed Sept. 26, 1958 4 Sheets-Sheet 2

INVENTOR.
JOHN J. AMBROZAITIS
BY Mandeville and Schweitzer
ATTORNEYS

INVENTOR.
JOHN J. AMBROZAITIS
BY Mandeville and Schweitzer
ATTORNEYS

INVENTOR.
JOHN J. AMBROZAITIS
BY Mandeville and Schweitzer
ATTORNEYS

United States Patent Office 3,184,162

Patented May 18, 1965

3,184,162

HIGH SPEED RESET COUNTER

John J. Ambrozaitis, Waterbury, Conn., assignor to Consolidated Electronics Industries Corp., Waterbury, Conn., a corporation of Delaware Original application Sept. 26, 1958, Ser. No. 763,753, now Patent No. 3,070,300, dated Dec. 25, 1962. Divided and this application Feb. 15, 1962, Ser. No. 173,567

10 Claims. (Cl. 235—139)

The present invention relates to counters, and more particularly to certain improvements in counter mechanisms incorporating a plurality of counting drums. This application constitutes a division of my copending application Serial No. 763,753, filed September 26, 1958, now United States Patent No. 3,070,300.

Although the present invention is not necessarily so restricted, it is particularly applicable for use in a timing device, where a counting mechanism, driven by a constant speed motor, for example, registers elapsed time or time intervals. One of the specific features of the invention resides in the provision in a counting mechanism utilizing Geneva-type mechanisms for effecting transfer between registers, of a novel and improved means for quickly resetting the counting mechanism to zero after a counting operation. In this respect, when the counting device is employed as a timer, for example, the counting mechanism may be cause to move in an advancing direction during the measurement of a relatively substantial interval of time (i.e., one hundred seconds) and under circumstances in which rewinding the counter to zero would require too much time. Accordingly, a simplified but highly effective arrangement is provided for resetting all of a plurality of counting drums to zero within an interval of time which is not substantially in excess of the time required to effect a single revolution of the fastest counting drum. The improved arrangement includes a novel means for simultaneously disengaging the various drums from the respective transfer mechanisms and from the main drive mechanism and bringing into operation stop means for engaging the respective drums as they are returned to zero positions. The several drums are mounted on a single drive shaft, in a manner providing limited running friction between the drums and means fixed to the shaft, so that, when the main drive means and transfer means are disconnected, the drums tend to rotate with the drive shaft and are returned thereby to their zero or starting positions within approximately a single revolution of the shaft.

Another specific feature of the invention resides in the provision, in a counting device (e.g. of the tens-transfer type) having Geneva-type transfer elements interconnecting drums of ascending order, of means operative when the transfer elements are disengaged for effecting resetting of the drums to zero positions, to orient the respective transfer elements appropriately for re-engagement with the respective drums after reset. Advantageously, the transfer elements are gears which interconnect the drums each with a drum of the higher order. The transfer gears are carried by a shaft which is moved away from the counting drums during reset, and means are provided for engaging the transfer gears during the reset period and effecting the appropriate rotational orientation thereof prior to re-engagement of the transfer gears with the reset drums.

One of the important features of the invention resides in the provision, in a counting device of the type described, of novel line-up means, effective at the end of a counting operation, to rotate the lowest order drum from any position between "nine" and "zero" index positions, for example, to the closer one of the two positions. Thus, in a tens-transfer counter, a drum of a higher order is caused to move from one index position to another during the interval in which the drum of the next lower order moves between its "nine" and "zero" index positions. At all other times, drums of the higher orders are stationary. Accordingly, on each occasion when the drum of the lowest order is stopped between the "nine" and "zero" index positions, one or more drums of the higher orders necessarily will be stopped between index positions. In accordance with the present invention, reading of the counter drums at the end of a counting or timing interval is facilitated greatly by the provision of means acting on the drum of the lowest order and effective to rotate the drum ahead to the "zero" index position or back to the "nine" index position on any occasion when the drum stops between those positions. The line-up is effected substantially instantaneously, at the end of the counting or timing interval, and all of the higher order drums of the counter are thus properly aligned in appropriate viewing windows.

A further specific feature of the invention resides in the provision of a simplified means operating in conjunction with the line-up means and effective immediately at the end of a counting or timing interval for engaging and frictionally retaining one or more of the drums of the counter, advantageously the drum of the highest order, so that the positions of the drums are held fixed, for convenient reading, even under conditions in which the counter is subject to substantial vibrations.

For a better understanding of the invention, and for a further discussion of various advantageous features thereof, reference should be made to the following detailed description and to the accompanying drawings, in which.

Figure 1:
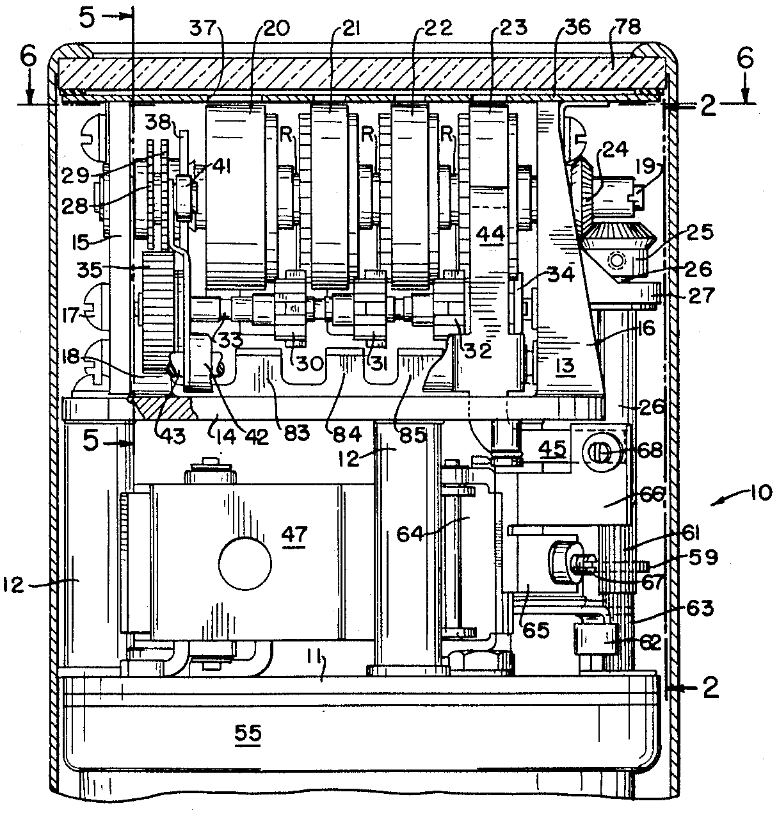
FIG. 1 is a fragmentary, longitudinal, cross-sectional view of a high speed reset timing device incorporating the improved features of the invention, the cross-sectional view being taken as on line 1—1 of FIG. 6.
Figure 2:
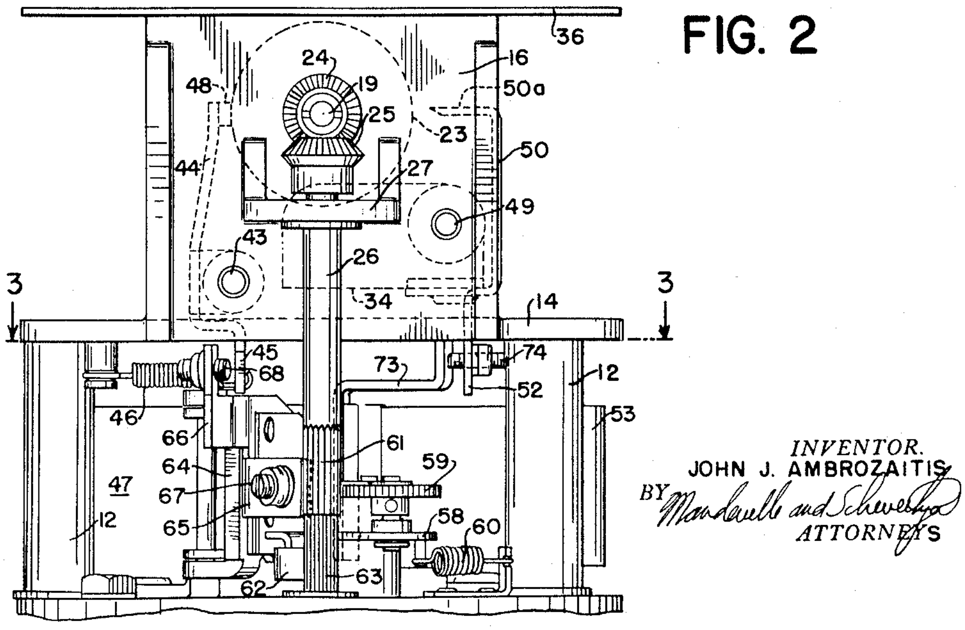
FIG. 2 is a fragmentary, side elevational view of the timer of FIG. 1, with the cover removed.

Referring now to the drawings, the reference numeral 10 designates generally a high speed, motor driven timer incorporating features of the invention and including a frame of conventional construction, comprising one or more decks 11 and a plurality of longitudinally disposed spacer posts 12. At the outer or forward end of the timer unit, a counter frame 13 is secured by its base 14 to outer ends of the spacer posts 12 and has spaced arms 15, 16 extending longitudinally outward from the base. Advantageously, the counter frame 13 may be of die-cast construction, although one of the arms 15 thereof may be secured by screws 17 to a frame bracket 18 to facilitate assembly and disassembly.

Journaled in the arms of the counter frame is a drive shaft 19 which mounts, between its ends, a plurality of counter drums 20–23. By means of suitable spacing collars or bushings (not specifically identified) and retaining rings R, the drums 20–23 are held in desired axial relation on the drive shaft 19. In accordance with the invention, the drums are rotatable on the drive shaft but are facially frictionally engaged by retaining rings R which are fixed to the shaft whereby relative rotation between the shaft and drums is frictionally restrained to a limited degree. At one end, the drive shaft 19 mounts a bevel gear 24 which engages a similar bevel gear 25 fixed to the end of an input shaft 26 journaled in a bracket 27 on the counter frame and forming part of an input drive to be described in greater detail. At its opposite end, the drive shaft 19 mounts a pair of pinions 28, 29, which are advantageously of identical shape and size and, in accordance with the invention, one of the pinions, 28, is fixed to the drive shaft while the other pinion, 29, is rotatable on the shaft but is fixed to the adjacent drum 20 forming the lowest order drum of the counting mechanism.

The counting mechanism is, in its general operation, of a conventional tens-transfer type, in which drums of a lower order are connected each to a drum of a higher order. Thus, a plurality of transfer gears 30–32 are mounted for free rotation on a spindle shaft 33 supported at its ends in a rocker frame 34 to be described in more detail. Each transfer gear includes a first portion constituting a pinion of conventional form, which engages a gear fixed to a drum of a higher order, and a second portion which forms an element of a Geneva-type mechanism (advantageously, a pinion similar to the first portion but with alternate teeth removed) adapted for cooperation with an element of the mechanism carried by a lower order drum. During a complete revolution of the lowest order drum 20, for example, the drum holds the transfer gear 30 motionless during its traverse from a "zero" index position to a "nine" index position and then engages and rotates the gear through a predetermined angle as the drum rotates from a "nine" index position to a "zero" index position. The rotation of the transfer gear 30, during this limited interval, is such that the drum 21 of the next higher order is rotated from one index position to another. The operation of the other drums is, of course, similar so that each revolution of a drum of a lower order effects movement of a drum of the next higher order through one index position during the interval of movement of the lower order drum between "nine" and "zero" index positions.

Operation of the counting mechanism is effected by driving of the drum 20 of the lowest order, and this is accomplished, in accordance with the invention, by means of a transmission gear 35 mounted for rotation on the spindle shaft 33. The transmission gear 35, in its operative position, engages the pinions 28, 29 on the drive shaft 19. Accordingly, rotation of the shaft and the pinion 28 affixed thereto causes the transmission gear 35 to rotate and thereby effects the desired rotation of the pinion 29. Thus, as will be understood, when the transmission gear 35 is in its operative position, as shown in FIG. 1, for example, the gears or pinions 28, 29 are effectively locked together for rotation in unison. The drum 20 of the lowest order, which is affixed to the pinion 29, will thus rotate along with the drive shaft 19, and rotation of the drums 21–23 of higher orders is effected through the transfer gears 30–32 in the manner described.

Figures 11, 12, 13:
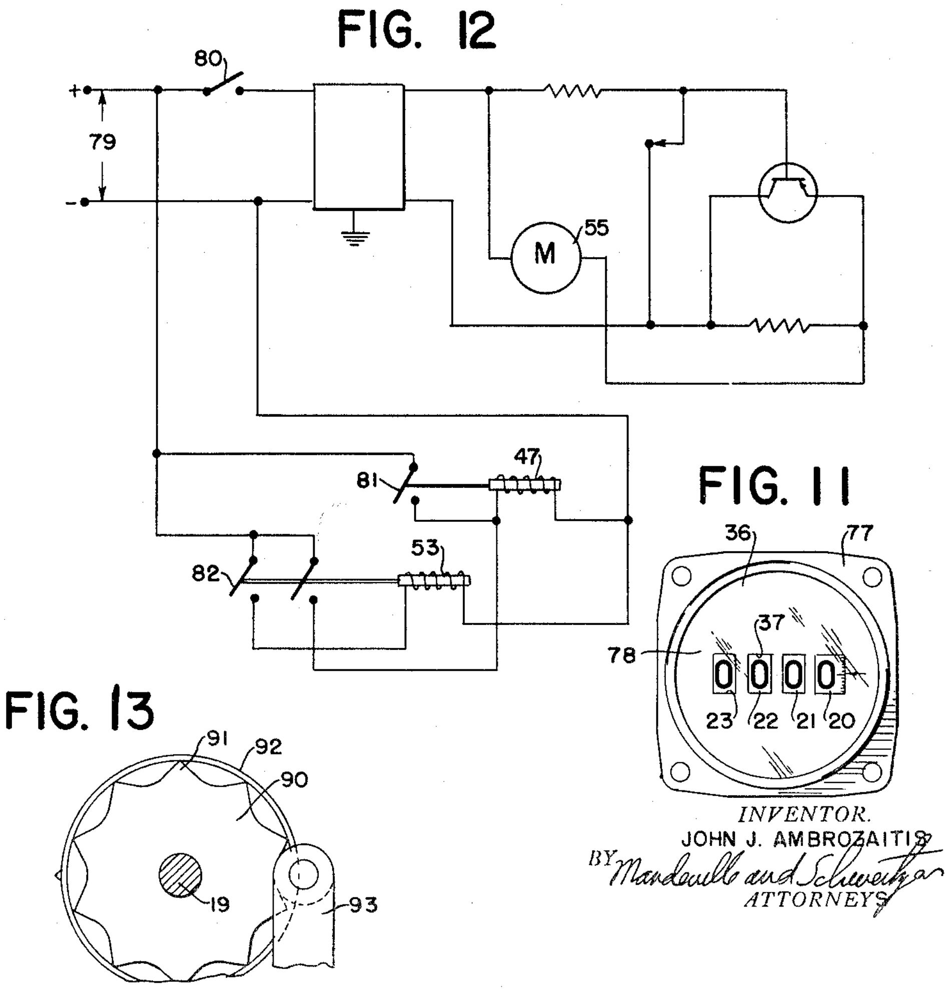
FIG. 11 is a front view of the timer assembled in its casing.
FIG. 12 is a simplified, schematic representation of a control circuit used in connection with the operation of the improved timer.
FIG. 13 is a fragmentary, cross-sectional view of a modified form of line-up means which may be used in the timer of FIG. 1.

The respective drums 20–23 have suitable indicia on their outer surfaces, such as circumferentially spaced numerals, from "zero" to "nine," and the drum 20 of the lowest order may additionally be provided with appropriate calibrations between the index numerals. A suitable face plate 36 is conveniently secured to the end of the counter frame 13 and is provided with a plurality of viewing windows 37, through which limited portions of the counting drums are visible from the front of the mechanism, substantially as indicated in FIG. 11. The drums 21–23 are not provided with calibrations between index positions, as the movement of the upper order drums takes place in increments of one index position, while movement of lowest order drum is continuous.

In the normal operation of a counting device of the type herein described, the lowest order drum 20 may, at the end of a counting or timing interval, lie between its "nine" and "zero" index positions, wherein indexing movement of one or more of the higher order drums is taking place. And, if the drums are held in such positions, the index numerals thereon will be improperly aligned with the viewing windows 37, so that rapid and accurate ascertainment of the numerals in difficult. Accordingly, as one of the important features of the invention, means are provided for acting upon the drum 20 of the lowest order, at the end of each operation, for moving the drum from any position between its "nine" and "zero" index positions (i.e., where the numerals "9" and "0" are partly exposed in the window 37) to the closer of the two index positions. To this end, a cam 38 is affixed to the lowest order drum 20 and is provided with a pointed lobe 39, visible in FIGS. 7–10, for example. In the first illustrated form of the invention, the cam 38 may be generally circular, except for the pointed, projecting lobe 39, and is advantageously provided at each side of the lobe 39 with small recesses or indentations 40. The cam 38 is adapted for cooperation with a cam follower 41, in the form of a roller carried at the end of a line-up arm 42. The line-up arm 42 is fixed to a shaft 43 and is adapted for limited rotational movement with the shaft.

Figure 9:
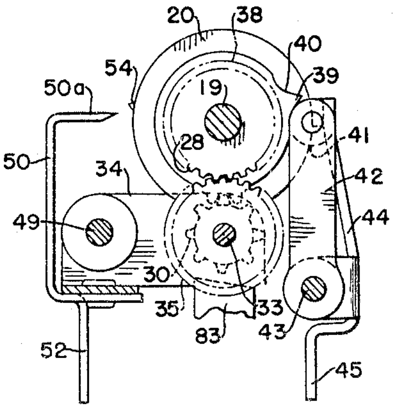
FIGS. 8 and 9 are simplified, cross-sectional views, similar to FIG. 7, illustrating the sequence of operations for effecting line-up of the drums at the end of a timing interval.
Figure 8:
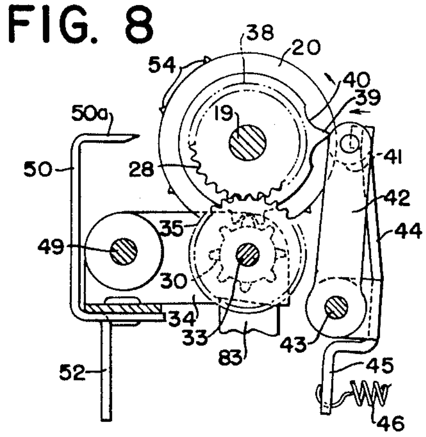
Figure 10:
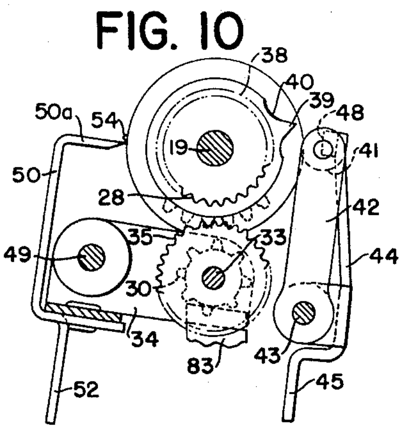
FIG. 10 is a simplified, cross-sectional view, similar to FIG. 7, illustrating the apparatus toward the end of reset.

The operation of the line-up means is illustrated generally in FIGS. 8 and 9, and is as follows: When the drum 20 of the lowest order stops in an index position between "9" and "0," the pointed lobe 39 of the cam 38 lies opposite the cam follower 41, which normally is held away from the cam. Immediately following the timing or counting interval, the line-up arm 42 is moved toward the cam, by rotation of the shaft 43, so that cam follower 41 engages the lobe 39 and causes the drum 20 to rotate in one direction or the other, to either the "nine" or the "zero" index position, depending upon which is closer. In this respect, it will be understood that the point of the cam lobe 39 is so positioned, with respect to the drum, as to cause the drum 20 to be rotated in either direction, when it stops at half way between its "nine" and "zero" positions, and to the closer index position when the drum stops in any position other than half way between "nine" and "zero." The recesses 40, on either side of the lobe 39, receive the follower 41 and prevent overtravel of the drum 20, due to inertia, following the line-up.

In the illustrated form of the invention, actuation of the line-up arm 42 is effected by means of an arm 44, which is affixed to the shaft 43, at the opposite end thereof, and has an actuating lever arm 45 which projects inwardly of the counter frame base 14 and engages a spring 46 anchored to the base 14 and urging the levers 42, 44 to pivot in a counterclockwise direction, as viewed in FIGS. 7–10. The lever arm 45 is arranged to be acted upon by a solenoid 47, to be described in greater detail, so that when the solenoid is actuated, the arms 42, 44 are pivoted in a clockwise direction and held away from the counter drums. When the solenoid 47 is de-energized, the spring 46 urges the arms 42, 44 counterclockwise, carrying the follower 41 into contact with the cam 38, to effect line-up rotation thereof in the event the lowest order drum 20 stops between its "nine" and "zero" index positions.

As one of the specific features of the invention, the arm 44 carries at its outer end a pad 48 of resilient friction material, e.g., foam rubber (allows some overtravel for lineup) which is adapted, when the arm is pivoted in a counterclockwise direction, to engage the drum 23 of the highest order to restrain frictional rotation of the drum. The arm 44, which may be referred to as the braking arm, acts in conjunction with the line-up arm 42, in that the friction pad 48 is held out of contact with the drum until the line-up follower 41 is seated against the circular portion of the cam 38, or in the recesses 40 thereof. Accordingly, braking force is not applied to the drums during the line-up correction. The provision of the braking arm 44 and pad 48 is also highly advantageous in mechanisms adapted for use in military aircraft, for example, where the mechanism may be subjected to substantial vibrations. Thus, the friction pad 48 engages the highest order drum 23, while the line-up follower 41 engages the cam 38 affixed to the lowest order drum, tending to hold all of the drums in their stopped positions to prevent slight misalignment of the drums, which might otherwise be caused by vibration of the mechanism and allowed by reason of backlash or the like in the transfer gears. In this respect, it has been found to be satisfactory and expedient to use a single friction pad 48 acting on the drum 23 of the highest order since that drum is subject to the greatest accumulated backlash and is most subject to misalignment caused by vibrations. However, as will be understood, additional brake arms and friction pads may be provided for holding individually some or all of the drums.

One of the important features of the invention resides in the provision of an improved rapid reset means for returning the several drums 20–23 to "zero" or starting positions at some time after each operational interval. To this end, the rocker frame 34, which mounts the spindle shaft 33 carrying the several transfer gears, is mounted for limited pivoting or rocking movement by means of a shaft 49 mounted at its ends in the counter frame 13. The rocker frame 34 includes a plurality of reset fingers, one for each of the counter drums 20–23, which extend toward the front of the mechanism and have portions 50*a* projecting generally radially inward toward the drive shaft 19. A spring 51 normally acts upon the rocker frame 34 to pivot the frame in a counterclockwise direction, as viewed in FIGS. 7–10, for example, so that the respective transfer gears 30–32 are urged into engagement with the drums 20–23 and the reset fingers 50 are held spaced away from the drums. A lever arm 52 projects inward from the rocker frame 34 and is arranged for actuating engagement with the arm of a solenoid 53, to be described in more detail, which may be referred to as the reset solenoid. Upon actuation of the solenoid 53, the rocker frame 34 is pivoted in a clockwise direction, so that the transfer gears 30–32 are disengaged from the drums 20–23 and reset fingers 50 are moved toward the drums so the end portions 50*a* thereof are in close proximity to the outer surfaces of the drums.

Movement of the frame 34 also carries the transmission gear 35 out of engagement with the pinions 28, 29, so that the drum 20 of the lowest order is disconnected from the drive shaft 19. Accordingly, the drums 20–23 are freely rotatable on the drive shaft 19, except as relative rotation between the drums and shaft may be restrained by the friction of the retaining rings R on the drums. Resetting of the respective drums to "zero" index positions is then effected by rotation of the drive shaft 19, advantageously in the same direction as it rotates during an operational interval, so that the drums 20–23 are rotated by frictional engagement with rings R (fixed on shaft as previously indicated), until reset pins 54 projecting from the surfaces of the respective drums engage the reset fingers 50*a*. The fingers 50*a* and pins 54 are so arranged as to stop the drums 20–23 in their "zero" positions, and rotation of the drive shaft 19 may continue since the shaft can rotate within the stationary drums. Advantageously, the frictional engagement between the drums 20–23 and the retaining rings R is such that little slippage of the drums on the shaft can occur until the reset pins 54 engage the arms 50. Accordingly, all of the drums of the mechanism, regardless of the number thereof, may be reset to "zero" in not substantially more than a single revolution of the drive shaft 19.

The illustrated mechanism is advantageously driven by a governed motor drive, generally indicated by the reference numeral 55, having an outlet shaft 56 (FIG. 4) to which is affixed a drive pinion 57. A combined clutch and brake mechanism is provided, which is advantageously of the type described and claimed in the United States Patent No. 2,772,760 of L. J. A. Van Lieshout, issued December 4, 1956, and owned by the assignee of the present application. In general, the clutch mechanism comprises a control plate 58 mounted for pivotal movement about the axis of the output shaft 56 and carrying a transmission gear 59 which meshes with the drive pinion 57. A spring 60 engages the plate 58 and also a fixed part of the mechanism framework to urge the plate 58 counterclockwise, as viewed in FIGS. 3 and 4, to a non-driving position. At desired times, however, the plate 58 may be pivoted clockwise to carry the transmission gear 59 into meshing engagement with a gear 61 fixed to or formed integrally with the shaft 26. Thus, when the plate 58 is pivoted clockwise, the counter mechanism is drivingly engaged with the motor unit 55.

The control plate 58 also carries a brake pad 62, positioned on the side of the shaft 26 generally opposite from the transmission gear 59, so that the brake pad 62 engages the shaft when the control plate is pivoted in a counterclockwise direction. As best shown in FIG. 1, the brake pad 62 is located adjacent a knurled portion 63 of the shaft 26, so that substantial friction is developed between the shaft and brake pad when the spring 60 draws the control plate in a counterclockwise direction.

In the illustrated apparatus, the control plate 58 is actuated by means of the solenoid 47, which may be referred to as the clutch solenoid. The solenoid 47 has an armature 64 pivoted at one side and having at one end actuating arm portions 65, 66, each having an adjusting screw 67, 68. Mounted on the armature and having a portion extending generally parallel to the actuating arm portion 65 is a yoke 69 formed of deformable material and having a recess 70 for receiving a pin 71 carried by the control plate 58.

Figures 3, 4:
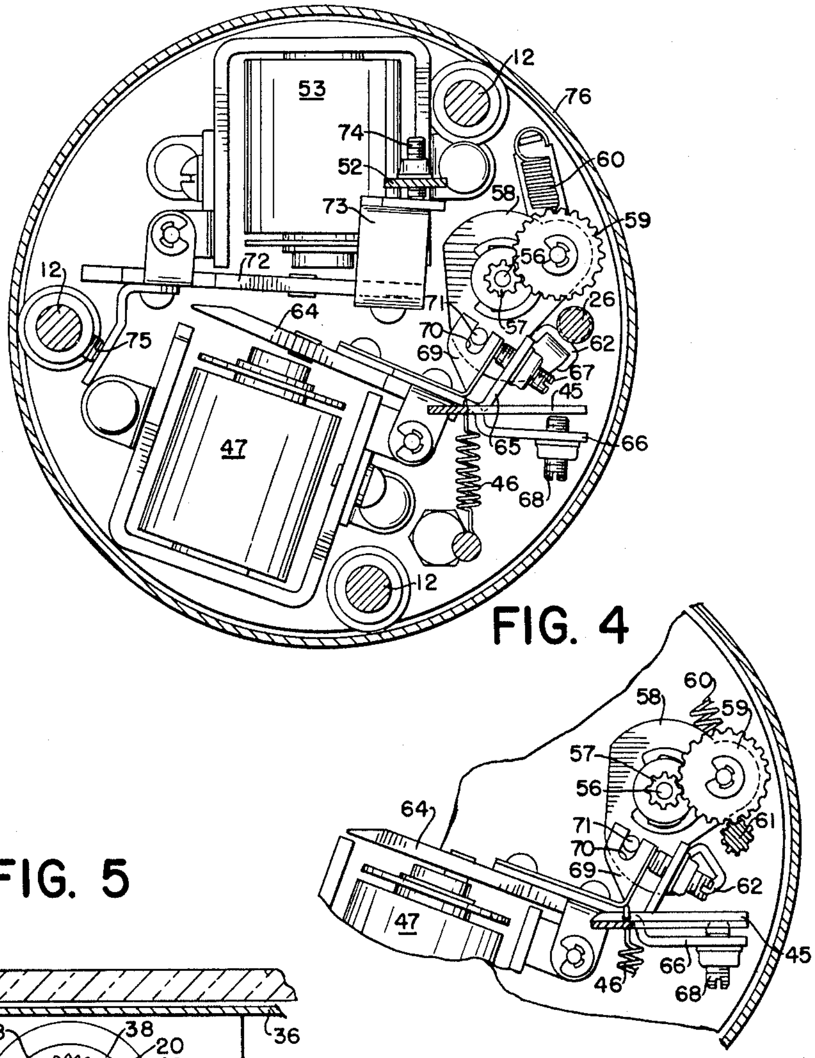
FIG. 3 is a cross-sectional view, as taken generally along line 3—3 of FIG. 2.
FIG. 4 is a fragmentary, cross-sectional view illustrating the operation of mechanism shown in FIG. 3.

By means of the yoke 69, movements of the armature 64 are translated to the control plate 58 to move it between its operative positions. And the orientation of the control plate and armature may be precisely adjusted by manipulation of the adjusting screw 67 whereby the disposition of the yoke 69 with respect to the armature may be varied to a limited extent. The armature 64 is normally held away from the core of the solenoid, by the action of the spring 60, but is moved toward the core upon energization of the solenoid, to carry the transmission gear 59 into mesh with the gear 61, substantially as shown in FIG. 4.

The second actuating arm portion 66 of the armature 64 acts, through the adjusting screw 68, upon the lever arm 45 affixed to the brake arm 44. Accordingly, when the clutch solenoid 47 is energized, to connect the counter mechanism to the drive motor unit 55, the lever arm 45 is simultaneously moved to release the drum 23 from the braking pad 48 and to move the line-up follower 41 away from the cam 38.

Figure 5:
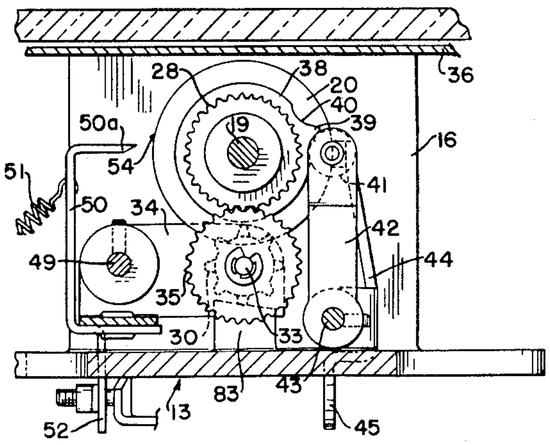
FIG. 5 is a fragmentary, cross-sectional view taken generally along line 5—5 of FIG. 1.
Figure 6:
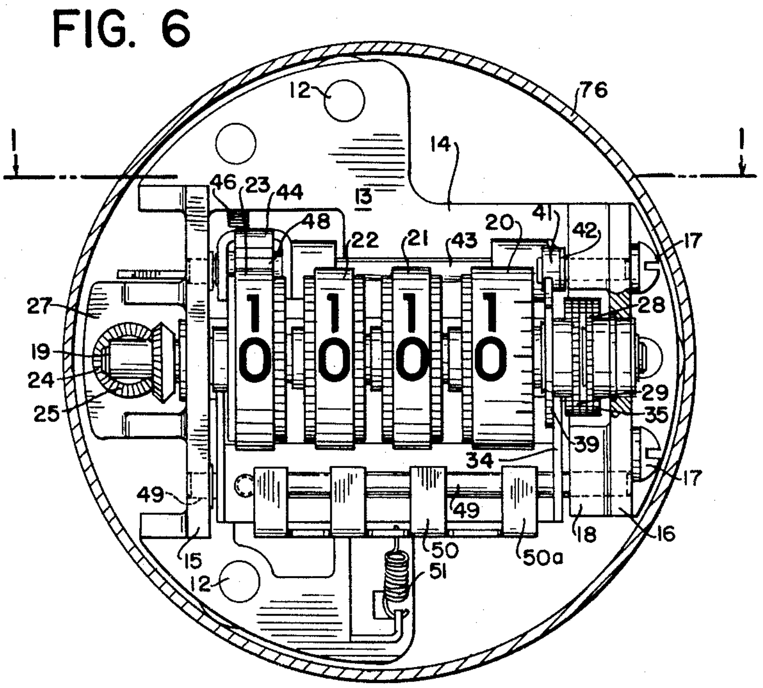
FIG. 6 is a cross-sectional view taken generally along line 6—6 of FIG. 1 and illustrating a front view of the counter mechanism.
Figure 7:
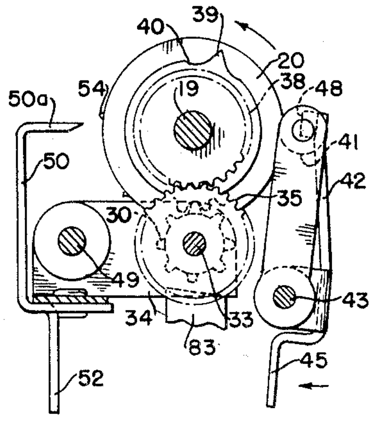
FIG. 7 is a simplified, cross-sectional view, similar to FIG. 5, illustrating the operation of the counting mechanism during a counting or timing interval.

The reset solenoid 53 has an armature 72 pivoted at one side and carrying an arm 73 which engages an adjusting screw 74 carried by the arm portion 52 of the rocker frame 34. The armature 72 is normally held away from the core of the reset solenoid, against an adjustable stop screw 75, through the action of the rocker frame return spring 51 (FIGS. 5, 6). However, when the reset solenoid is energized, the armature 72 is pivoted toward the solenoid core and the rocker frame is caused to tilt to a position permitting resetting of the drums.

In one advantageous application of the new mechanism, the mechanism is housed in a tubular casing 76 provided with a front flange 77 and a viewing window 78. The mechanism may be used as an interval timer, for example, and in a typical use is adapted to time or measure intervals up to 99.99 seconds, in which case the drum 20 of the lowest order has index positions corresponding to hundredths of a second, the drum 21 of the next higher order has index positions corresponding to tenths of seconds, and so on. In addition, the lowest order drum 20 may be calibrated in units of ten, between index positions, the calibrated units representing milliseconds. The mechanism is, of course, capable of being arranged for use with smaller or larger time units.

To ready the instrument for timing, the motor unit 55 is energized and set into operation. To start the timing interval, the clutch solenoid 47 is energized to connect the drive shaft 19 to the motor output and set the counting drums in motion. At the end of the timing interval the clutch solenoid 47 is de-energized, which simultaneously disengages the drive shaft 19 from the motor unit and brings the brake pad 62 into engagement with the shaft 26 to stop the motion of the drums. Simultaneously with the de-energization of the clutch solenoid 47, the shaft 43, mounting the line-up and brake arms 42, 44 is permitted to rotate in a counterclockwise direction by the spring 46 to effect lineup of the lowest order drum 20, if necessary, and braking of the highest order drum 23, in sequence. The time may then be "read."

In order to reset the drums 20–23 to "zero" or starting positions, the clutch and reset solenoids 47, 53 are energized simultaneously, the motor 55 having been previously set into motion. This causes the drive shaft 19 to rotate. However, since the rocker frame 34 is moved by the reset solenoid to carry the transfer gears 30–32 and the transmission gear 35 out of their operative positions, the drums tend to rotate with the shaft, by frictional engagement, until the reset pins 54 engage the reset arms 50, at which time the several drums are properly aligned in their "zero" or starting positions.

A typical circuit for actuating the timing mechanism is illustrated in FIG. 12, in which the motor unit 55 is arranged to be connected to an appropriate source of electrical potential 79 by a switch 80. The switch 80 constitutes a make-ready switch, which sets the motor in operation prior to the timing of an interval. Timing is initiated by closing a switch 81 connected in the energizing circuit of the clutch solenoid 47, and reset is initiated by closing a double-throw switch 82 having contacts connected in the energizing circuits of both the clutch and reset solenoids 47, 53.

As one of the important features of the invention, means are provided for properly orienting the several transfer gears 30–32 during a reset operation so that the gears are appropriately disposed for re-engagement with the reset drums. To this end, the counter frame 13 is provided on its base 14 with a plurality of abutments 83–85 disposed below the transfer gears 30–32 respectively. The abutments 83–85 have upper surfaces adapted to engage the transfer gears when the rocker frame 34 is moved to reset position, substantially in the manner indicated in FIG. 10. And the surfaces of the abutments are disposed at such an angle that, when the surfaces are engaged by teeth of the transfer gears, the gears are held in a rotational orientation appropriate for re-engagement with the drums, after the drums are reset to "zero" positions. This is of particular importance in the illustrated form of transfer mechanism, since the respective abutment surfaces prevent rotation of the transfer gears, as might be caused by vibration, for example, so that, upon re-engagement of the transfer gears with the drums, transfer from one drum to another will take place at a proper time.

In the form of the invention shown in FIG. 13, a modified line-up cam 90 is provided with ten line-up lobes 91, one for each of the index positions of the lowest order drum 92. Accordingly, at the end of a timing or counting interval, when the line-up arm 93 is moved toward the cam, the lowest order drum will be moved to the nearest exact index position. The modified arrangement further facilitates reading of the drums, since all four drums will be properly aligned in their respective windows.

The improved device of the invention is especially adapted for use as a high speed timer, capable of accurate registration, quick reading and rapid reset, and has features rendering it suitable for use in military aircraft, for example, where substantial vibration may be encountered. The improved arrangement for effecting line-up of the drums is especially advantageous where timer readings must be made quickly and accurately, and possibly under conditions of severe stress. Resetting of the timer is practically instantaneous (i.e., about one tenth of a second in the illustrated representative timer), and continued operation of the motor, after the drums reach their respective "0" positions, does not damage the device, as the drive shaft merely continues to rotate within the stationary drums.

It should be understood, however, that the specific forms of the invention herein illustrated and described are intended to be representative only as certain changes may be made therein without departing from the clear teachings of the disclosure. Accordingly, reference should be made to the following appended claims in determining the full scope of the invention.

I claim:

1. A direct reading tens-transfer counter, comprising a plurality of drums mounted for rotation, external drive means for the lowest order drum, Geneva-type transfer means interconnecting all said drums, each to a drum of the next higher order, said transfer means being operative upon rotation of the lowest order drum from a "9" position to a "0" position to effect rotation of the drum of the next higher order from one index position to another, means for initiating a counting period, means for terminating a counting period, and line-up means operative in association with said means for terminating a counting period at the end of a counting operation and acting only upon the drum of the lowest order for rotating that drum from any position between its "9" and "0" positions only to the closer of the two positions.

2. The counter of claim 1 in which said line-up means comprises a cam fixed to the lowest order drum only and an arm movable toward said cam, and said cam has a surface portion engageable with said arm, when said lowest order drum is between "9" and "0" positions, for effecting rotational displacement of said cam and drum to the closer of the two positions.

3. The counter of claim 2, in which said cam is generally circular and has a pointed lobe engageable with said arm when said lowest order drum is between "9" and "0" positions, and said cam has recesses for lockingly engaging said arm upon rotation of the cam to "9" or "0" positions.

4. The counter of claim 2, which includes an arm movable toward said cam, said cam has a plurality of projecting lobes, one for each index position, and said lobes have apices at points corresponding to drum positions midway between index positions, whereby movement of the arm into engagement with the cam effects rotation of the cam to a position corresponding to the closest index position of said drum.

5. A direct reading tens-transfer counter according to claim 1, which includes brake means operative at the end of a counting operation and in sequence with said line-up means for engaging and restraining against rotational displacement a single drum only, said drum being the drum of the highest order.

6. A direct reading tens-transfer counter comprising a drive shaft, external means for rotating said drive shaft, a plurality of counter drums of ascending order rotatively mounted on said drive shaft, transfer means interconnecting lower order drums each to a drum of the next higher order, drive means connecting said shaft and the drum of lowest order, means for initiating a counting period, means for terminating a counting period, line-up means preventing said lowest order drum from stopping between the "9" and "0" positions, and brake means acting only upon the highest order drum for restraining the rotation of said highest order drum after said lowest order drum has stopped.

7. The counter of claim 6, in which said line-up means comprises a cam fixed to the lowest order drum and an arm movable toward said cam, said cam is generally circular and has a pointed lobe engageable with said arm when said lowest order drum is between "9" and "0" positions, said cam has recesses for lockingly engaging said arm upon rotation of the cam to "9" or "0" positions, and said cam has a surface portion engageable with said arm, when said lowest order drum is between "9" and "0" positions, for effecting rotational displacement of said cam and drum to the closer of the two positions.

8. A direct reading tens-transfer counter comprising a drive shaft, external means for rotating said drive shaft, a plurality of counter drums of ascending order rotatively mounted on said drive shaft, transfer means interconnecting lower order drums each to a drum of the next higher order, drive means connecting said shaft and the drum of lowest order, means for initiating a counting period, means for terminating a counting period, line-up means preventing said lowest order drum from stopping between the "9" and "0" positions, brake means for restraining the rotation of said highest order drum after said lowest order drum has stopped, and an auxiliary shaft, said auxiliary shaft being maintained in a spaced relation to said drive shaft, said auxiliary shaft being adapted for rotation about its axis, said line-up means and said brake means being adapted for movement toward and away from said drive shaft, said line-up means and said brake means being fixedly mounted on said auxiliary shaft in a predetermined mutual relationship, whereby said brake means is effectively operative substantially simultaneously with the completion of the operation of said line-up means.

9. A counter according to claim 8 which includes actuating means for rotating said shaft in a direction to move said line-up means and said brake means away from said drive shaft, and a spring means urging said shaft to rotate in a direction to move said line-up means and said brake means toward said drive shaft.

10. A counter according to claim 9 wherein said actuating means comprises a solenoid acting in opposition to the action of said spring means, said solenoid being adapted to be energized by said means for initiating a counting operation and to be de-energized by said means for terminating a counting period upon the completion of a counting operation.

References Cited by the Examiner

UNITED STATES PATENTS

| | | | |
|---|---|---|---|
| 1,758,461 | 5/30 | Ogden | 235—144 |
| 2,668,013 | 2/54 | Dawson | 235—136 |
| 2,682,373 | 6/54 | Opocensky | 235—117 |

LEO SMILOW, *Primary Examiner.*